(12) United States Patent
Pfannenberg

(10) Patent No.: US 8,152,885 B2
(45) Date of Patent: Apr. 10, 2012

(54) AIR PASSAGE DEVICE HAVING IMPROVED ACCESSIBILITY OF THE FILTER MAT

(75) Inventor: Andreas Pfannenberg, Hamburg (DE)

(73) Assignee: Pfannenberg GmbH, Hamburg (DE)

( * ) Notice: Subject to any disclaimer, the term of this patent is extended or adjusted under 35 U.S.C. 154(b) by 964 days.

(21) Appl. No.: 11/890,284

(22) Filed: Aug. 3, 2007

(65) Prior Publication Data
US 2008/0053049 A1 Mar. 6, 2008

(30) Foreign Application Priority Data

Aug. 7, 2006 (DE) .................... 20 2006 012 058 U

(51) Int. Cl.
B01D 46/00 (2006.01)
(52) U.S. Cl. ............................................ 55/478; 55/493
(58) Field of Classification Search .................... 55/493, 55/481, 506, 471, 472, 473, 385.6, 502, 503, 55/507, DIG. 7, DIG. 34; 454/309, 229, 454/257, 184; 340/577, 628; 49/394; 19/144
See application file for complete search history.

(56) References Cited

U.S. PATENT DOCUMENTS

| | | | |
|---|---|---|---|
| 5,588,259 A * | 12/1996 | Kolefas | ........................... 49/394 |
| 5,679,121 A | 10/1997 | Kim | |
| 6,030,427 A | 2/2000 | Sorice et al. | |
| 6,092,386 A | 7/2000 | Lee | |
| 6,110,245 A * | 8/2000 | Schlag et al. | ................ 55/385.6 |
| 6,354,936 B1 | 3/2002 | Noh et al. | |
| 2003/0024599 A1* | 2/2003 | Hagano et al. | ................ 141/348 |

FOREIGN PATENT DOCUMENTS

| | | |
|---|---|---|
| DE | 3230511 | 2/1984 |
| DE | 40 13 645 | 5/1991 |
| DE | 4013645 | 5/1991 |
| DE | 100 51 643 | 5/2002 |
| DE | 202004001075 | 5/2004 |
| EP | 1098692 | 5/2001 |
| FR | 2323042 | 4/1977 |
| SU | 591619 | 2/1978 |
| SU | 375863 | 2/1988 |

* cited by examiner

Primary Examiner — Duane Smith
Assistant Examiner — Karla Hawkins
(74) Attorney, Agent, or Firm — Lucas & Mercanti, LLP; Klaus P. Stoffel

(57) ABSTRACT

An air passage device, in particular a filter fan or outlet filter for installation in a mounting opening in a wall or in a housing of a switch cabinet, which is essentially formed by a ventilation grating and a main housing, and a filter mat is insertable between the ventilation grating and the main housing, the ventilation grating being situated on the main housing using an articulated connection, the ventilation grating having joint pins to form the articulated connection, which may each be guided in joint pin guide structures introduced into the main housing, the joint pin guide structures each connecting at least one closure position, one folded-out catch position, and one removal position to one another. An air passage device is thus provided which, based on a simple construction, allows high flexibility in regard to the operation of the ventilation grating and the filter mat.

12 Claims, 4 Drawing Sheets

AIR PASSAGE DEVICE HAVING IMPROVED ACCESSIBILITY OF THE FILTER MAT

BACKGROUND OF THE INVENTION

1. Field of the Invention

The present invention relates to an air passage device, in particular a filter fan or outlet filter, which is optionally implemented having a ventilator. An air passage device of this type is implemented for installation in a mounting opening in a wall, in a housing of a switch cabinet, or similar installation situations. In particular, the air passage device may be provided for dissipating waste heat from housings of electrical installations, electronics, or the like, as already known from the prior art in switch cabinets, electronics cabinets, computer housings, or the like.

2. Description of the Related Art

Air passage devices of this type are essentially formed by a ventilation grating and a main housing, a filter mat being insertable between the ventilation grating and the main housing. The ventilation grating may be situated on the main housing using an articulated connection.

The ventilation grating and the main housing each have air passage slots, between which the filter mat is inserted, so that the air flow passes the filter mat. The filter mats used in these filter fans are clamped between the ventilation grating and the main housing, the filter mat itself being able to be implemented as dimensionally stable and being provided with stiffened side walls.

A filter fan housing having a floor-side air intake and an air outlet is known from Patent Specification DE 100 51 643 B4. The air intake is at a right angle to the air outlet, the air outlet opening being connected to the inner chamber of a switch cabinet. A filter mat is situated in the inner chamber of the housing, which assumes a diagonal position, so that the air flow is guided from the air intake to the air outlet through the filter mat. The inner chamber of the filter mat housing is accessible via a closable maintenance opening to be able to perform a filter mat change.

An air filter for an electronics housing, which allows replacement of the filter mats without interrupting the operation of the device, is known from Published Application DE 40 13 645 A1. For this purpose, the air filter has a filter mat, using which dust and contaminants are removable from an air flow suctioned in from outside, and a carrier, in which the filter mat is attached and which comprises a retention frame and a handle for handling the carrier. Furthermore, retention units for holding the carrier in or on the housing by engaging it as a sealing terminus in front of ventilation openings of the housing, and guide units are provided, which are attached to the housing in such a way that the carrier is movable through an insertion opening in the housing along the guide units to the retention units and back out again and may be engaged in the retention units.

Utility Model DE 20 2004 001 075 discloses an air passage device, in particular a filter fan or outlet filter with or without a fan to be installed in a mounting opening in a wall, in particular of a housing of components which generate waste heat, such as a switch cabinet, electronics cabinet, computer system, or the like, the air passage device comprising a main housing with or without a fan carrier, a ventilation grating implemented as a design cover, and a filter mat situated between the main housing and the ventilation grating. The ventilation grating is situated on the main housing using an articulated connection and is rotatable around a pivot axis. Therefore, for example, in the event of a change of the filter mat, the ventilation grating may be opened like a flap out of the main housing by a pivot movement, so that the filter mat is freely accessible. The connection between the ventilation grating and the main housing comprises a pivot unit, which is implemented as a fixed or removable hinge, as a catch hinge, or as a film hinge.

However, the air passage devices are frequently situated at locations which are difficult to access, which are only reachable overhead for a user, for example. Changing the filter mat over the head of the operator is made more difficult because the ventilation grating is situated fixed on the main housing and may only execute a simple pivot movement. The filter mat is frequently attached in the ventilation grating itself, so that when the fan housing is pivoted out of the main housing, the filter mat lies on top inside the ventilation grating. In addition, producing an articulated connection, which is frequently executed using separate articulated connection elements, is problematic.

SUMMARY OF THE INVENTION

It is therefore the object of the present invention to provide an air passage device, which overcomes the disadvantages of the above-mentioned prior art and, based on a simple construction, allows high flexibility in regard to the operation of the ventilation grating and the filter mat.

According to the present invention, to form the articulated connection, the ventilation grating has joint pins, which may be guided in particular joint pin guide structures introduced into the main housing, the joint pin guide structures each connecting at least one closure position, one folded-out catch position, and one removal position to one another.

The present invention offers the advantage that the articulated connection permits multiple possibilities for handling the ventilation grating. The ventilation grating may be situated in a closure position inside the main housing, and may be transferred from the closure position into a folded-out catch position. The folded-out catch position allows access to the filter mat, so that it may be removed by the operator and is replaceable with a new filter mat. The filter mat may be clamped inside the ventilation grating, so that the filter mat is folded out of the main housing jointly with the ventilation grating with its folding movement. Therefore, removal of the filter mat is possible especially simply and advantageously.

If the ventilation grating having the joint pins is transferred into the removal position, the ventilation grating may be removed completely from the main housing using a simple hand movement. In particular in the event of inaccessible positions of the air passage device, for example, in an overhead position of the operator, the removal of the ventilation grating may be especially advantageous to remove the filter mat therefrom and replace it with a new filter mat, for example.

The joint pin guide structure guides the joint pins of the ventilation grating, the joint pin guide structure opening into the removal position, and releasing the guide structure to the outside. Therefore, the joint pins of the ventilation grating may be removed from the path-like guide structure. If the ventilation grating is inserted back into the main housing, the ventilation grating having the joint pins situated thereon solely has to be threaded into the joint pin guide structure, so that both the closure position and also the folded-out catch position may be assumed again via the removal position.

According to a further exemplary embodiment of the present invention, the ventilation grating has two diametrically opposite external faces, on each of which a joint pin is molded directed outward. The joint pins extend in the direction outward and form a joint pivot axis, around which the ventilation grating is pivotable in relation to the main housing. The ventilation grating comprises an essentially frame-shaped structure having ventilation slots implemented on the interior. The ventilation grating may be produced as an injection-molded part in one piece and of uniform material, all features, such as the joint pins in particular, being molded onto the body of the ventilation grating. The joint pins each point outward and are situated on a shared pivot axis. The diametrically opposing external faces form the lateral vertical delimitation faces of the ventilation grating, for example, the pivot axis also running on the bottom side in the horizontal of the ventilation grating. Therefore, the ventilation grating may be rotated from a vertical beginning around the lower edge of the ventilation grating, so that the pivot axis is located at least in proximity to the lower edge. In the closure position, the ventilation grating engages inside the main housing on the upper side.

According to an additional embodiment of the present invention, the main housing has two diametrically opposite internal faces, in each of which a joint pin guide structure is implemented, the particular internal faces of the main housing adjoining the particular external faces of the ventilation grating. The ventilation grating is thus enclosed inside the main housing in the closed state. The internal faces of the main housing each adjoin the external faces of the ventilation grating on one side. Because the two faces are diametrically opposite and the joint pin guide structure is implemented on the internal faces of the main housing and the joint pins are also implemented on the external faces of the ventilation grating, these pins may engage and be guided inside the joint pin guide structure. The gap dimension between the diametrically opposite internal and external faces is dimensioned as narrow in such a way that the joint pins may not jump out of the joint pin guide structure. The pivot axis advantageously runs in the horizontal and is situated on the lower side of the ventilation grating and/or the main housing. If the ventilation grating is opened inside the main housing, it pivots around the pivot axis from the closure position into the folded-out catch position, the pivot axis not being fixed in place in relation to the main housing, but rather traveling from the closure position into the folded-out catch position. Simultaneously, the ventilation grating pivots around the pivot axis until it comes to rest upon reaching the folded-out catch position by the joint pins. In the folded-out catch position, the ventilation grating still projects at least partially into the main housing, so that the internal faces of the main housing and the external faces of the ventilation grating are still situated diametrically opposing at least in the area of the articulated connection.

According to a further advantageous embodiment of the present invention, a blocking cam is provided inside the joint pin guide structure between the folded-out catch position and the removal position, to prevent a direct transition from the folded-out catch position into the removal position The blocking cam is implemented by a lug-shaped contour between the removal position and the folded-out catch position, so that the ventilation grating must first be returned into or at least in proximity to the closure position, so that the joint pins may take the path in the direction of the removal position inside the joint pin guide structure.

The joint pin guide structure is formed by radial contours, to provide running or sliding of the joint pins inside the joint pin guide structure without wedging. According to an abstract observation, the shape of the joint pin guide structure corresponds to a outstretched foot with the transition into the lower leg. The tip of the foot is formed by the closure position, the heel being formed by the folded-out catch position. The blocking cam also corresponds to the Achilles tendon area, so that the removal position corresponds to the transition into the lower leg. Therefore, it is obvious that the joint pin guide structure solely comprises radial contours, without the soft radial contours being interrupted by corners or edges meeting one another.

According to a further advantageous embodiment of the present invention, the joint pin guide structure is implemented in the internal faces having a depth of 0.2 mm to 2.5 mm, preferably 0.5 mm to 1.5 mm, and especially preferably 1.0 mm. The structure depth of the joint pin guide structure is thus less than the length of the joint pin. In this way, the internal faces of the main housing do not press flatly against the external faces of the ventilation grating, but rather are held apart by a gap by the longer joint pins. According to the overall implementation of the joint pin guide structure, it may be understood in such a way that a particular path-like guide is provided between the closure position and/or the folded-out catch position and/or the removal position, so that the particular positions are reachable from one another. The joint pin runs inside the paths between the particular positions, and is guided by the radial contours. The ventilation grating is thus guided in a restricted way between the closure position and the folded-out catch position or the removal position, the width of the guide paths between the individual positions being greater than the diameter of the joint pins to maintain a minimum play.

The joint pin guide structure is implemented on the right and left sides inside the internal side of the main housing in such a way that the transition from the folded-out catch position into the removal position is achievable by a plane-parallel displacement of the ventilation grating in relation to the main housing. Firstly, the ventilation grating must be opened slightly for this purpose, so that it is folded out at a small angle from the main housing. The blocking cam may have the joint pin travel over it by a plane-parallel displacement of the ventilation grating in such a way that the removal position is achievable. The plane-parallel nature of the displacement is solely to be understood as approximate, because both the ventilation grating and also the main housing may be situated plane parallel to one another exclusively in the closure position.

The joint pins advantageously have a bevel, which points in the direction of the main housing which may be situated adjoining the ventilation grating and comprises a partial shortening of the joint pin. In this way, the ventilation grating may be inserted more easily into the main housing. The bevel causes a slight shortening of the joint pin, so that threading the particular external faces of the ventilation grating into the internal faces of the main housing is made easier According to a further advantageous exemplary embodiment, the joint pin assumes the closure position in the closed state of the ventilation grating in the main housing, the main housing partially framing the ventilation grating, so that a plane-parallel movement between the ventilation grating and the main housing is prevented. Furthermore, the ventilation grating is held connected to the main housing in the closed state by the joint pin on at least one side of the pivot axis. The ventilation grating is thus held connected by the joint pin inside the main housing on the side of the joint axis, cam-like protrusions also being able to be molded inside the frame of the ventilation grating on the diametrically opposite side, which engage in diametrically opposing catches. The catches are molded in the internal frame area of the main housing, so that the ventilation grating is solely held situated and closed in the main housing by the joint pins and the cam-like protrusions inside the ventilation grating. To limit the pivot angle of the ventilation grating around the pivot axis, a body edge of the ventilation grating may abut a body edge of the main housing when the joint pin catches in the folded-out catch position. The particular body edges are opposite one another in such a way that they first contact one another and thus delimit the pivot movement upon rotation of the ventilation grating around the pivot axis.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
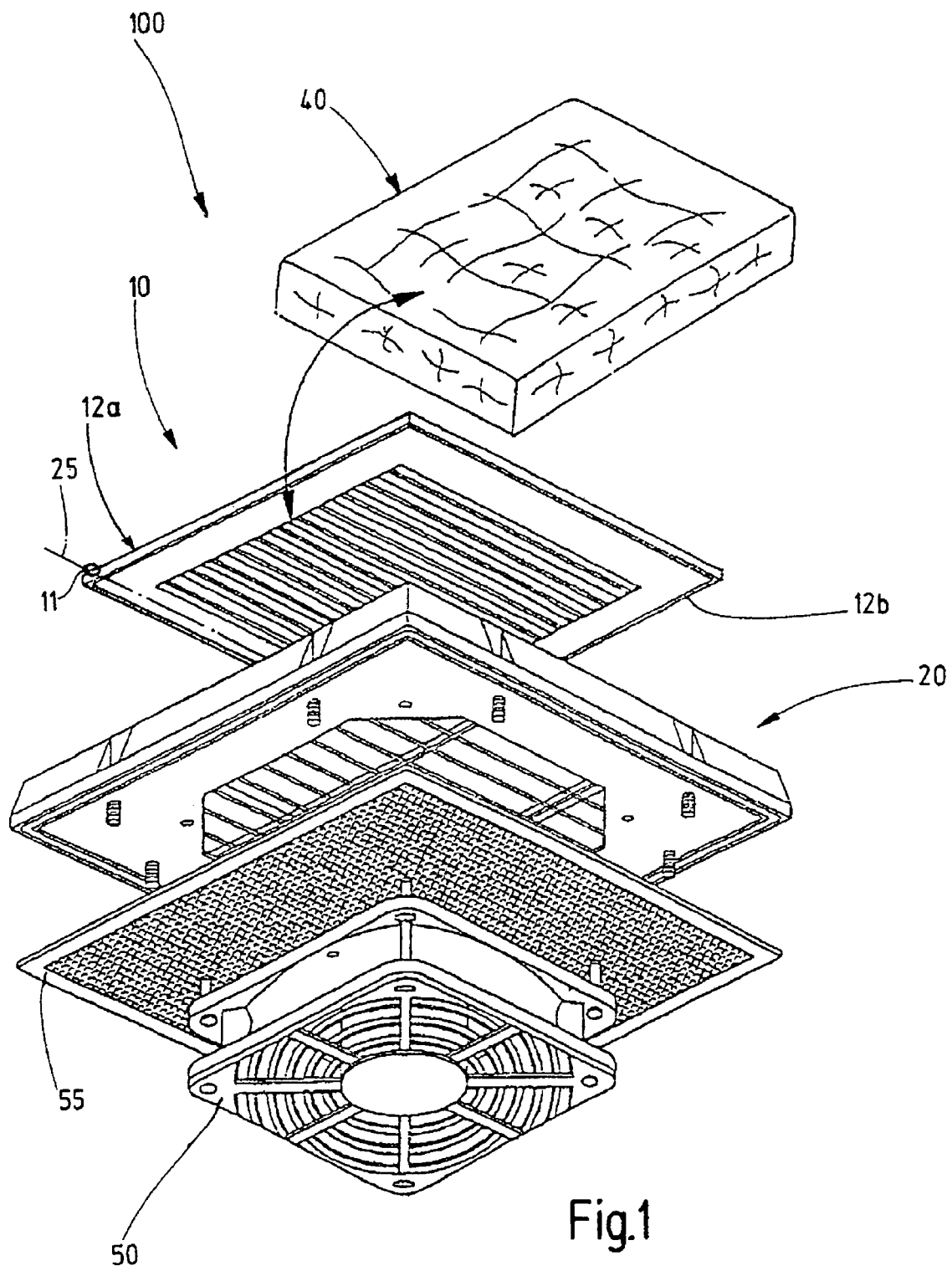
FIG. 1 is an exploded view of the air passage device, comprising a filter mat, a ventilation grating, a main housing, and an optional ventilator.

The air passage device 100 illustrated in FIG. 1 is used for installation in a mounting opening in a wall or in a housing of a switch cabinet or the like. A main housing 20 is provided for installing it permanently in the mounting opening. The main housing 20 is implemented like a frame and may either be screwed, clamped, or also glued, foamed, or cemented into the mounting opening. The frame of the main housing 20 has a central air passage grating, through which the air to be conveyed may pass. According to the illustration in FIG. 1, the air passage device 100 is implemented having a fan 50, which is situated above an intermediate grating 55 on the main housing 20.

A ventilation grating 10 may be attached so it is pivotable using an articulated connection on the mounting-open side of the main housing 20. The pivotable attachment is provided via joint pins 11, which are situated on the ventilation grating 10. The ventilation grating 10 is laterally delimited via a first external face 12a and a second external face 12b, onto each of which a joint pin 11 is molded. The joint pins 11 extend out of the particular external faces 12a and 12b in a shared pivot axis 25. The ventilation grating 10 is capable of accommodating a filter mat 40, the filter mat 40 being able to be situated on the internal side of the ventilation grating 10. If the ventilation grating 10 is attached in the main housing 20 and closed therein, the filter mat 40 is located between the ventilation grating 10 and the main housing 20. The insertion direction of the filter mat 40 is indicated using an arrow on the basis of the diagram of the exploded illustration.

Figure 2:
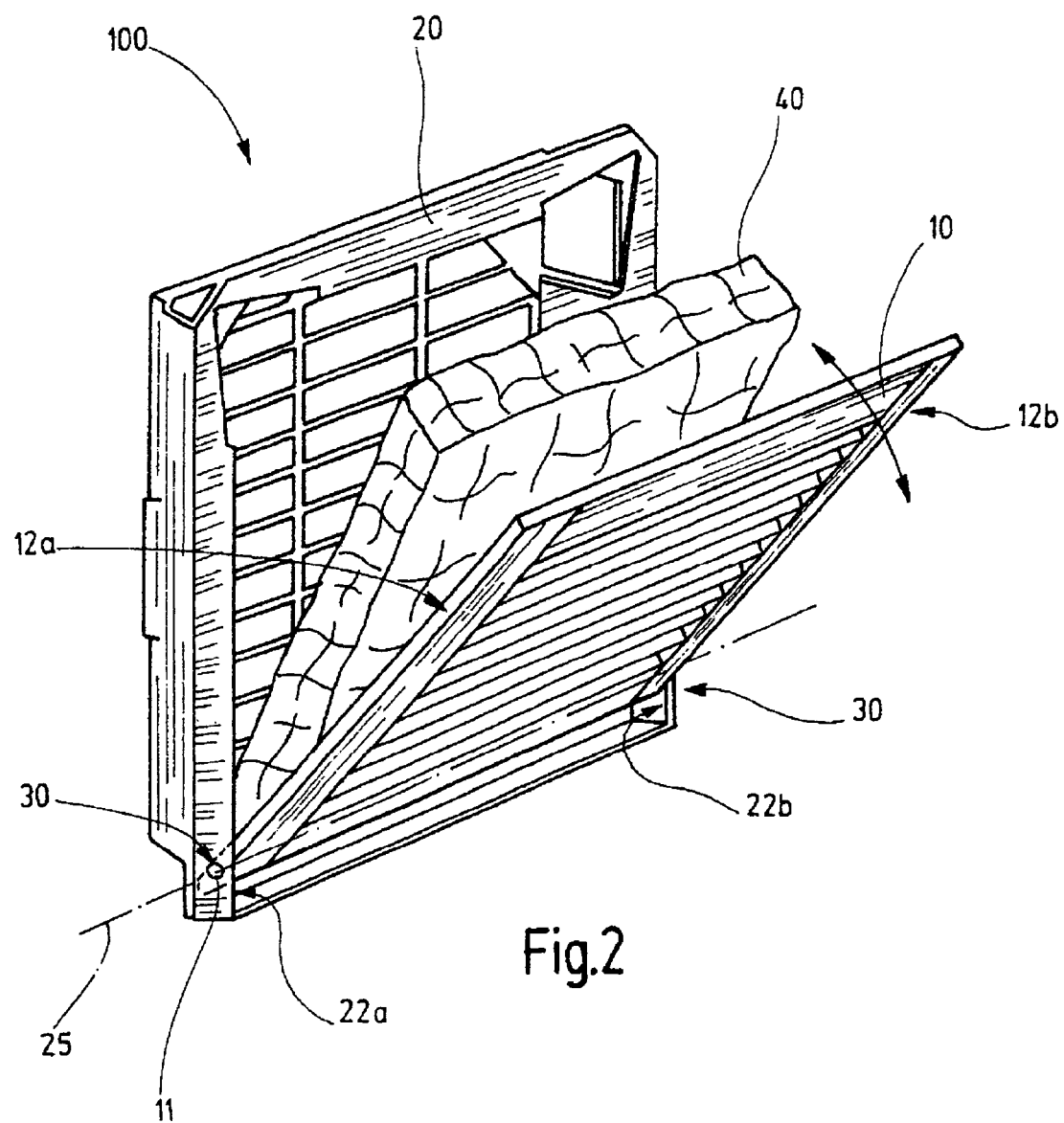
FIG. 2 is a perspective illustration of the main housing having folded-out ventilation grating and a filter mat situated between the main housing and the ventilation grating.

FIG. 2 shows the air passage device 100 without the fan and the intermediate grating. According to the illustration, the ventilation grating 10 is inserted into the main housing 20, and is held attached thereon via the articulated connection 30. The illustration indicates the pivotability of the ventilation grating 10 around the pivot axis 25. The filter mat 40 is shown in a loose configuration between the ventilation grating 10 and the main housing 20, in a position in which it may be changed. The left and right articulated connections 30 are provided via the joint pins 11, only the forward joint pin 11 being recognizable because of the perspective illustration. This extends in the direction of the internal face 22a of the main housing 20. On the opposite side, the main housing 20 has the internal face 22b, in which a joint pin 11 extends in the same way. The external face 12a is opposite to and directly adjoins the internal face 22a in the joined state of the ventilation grating 10 in the main housing 20, the external face 12b being opposite the internal face 22b.

Figure 3:
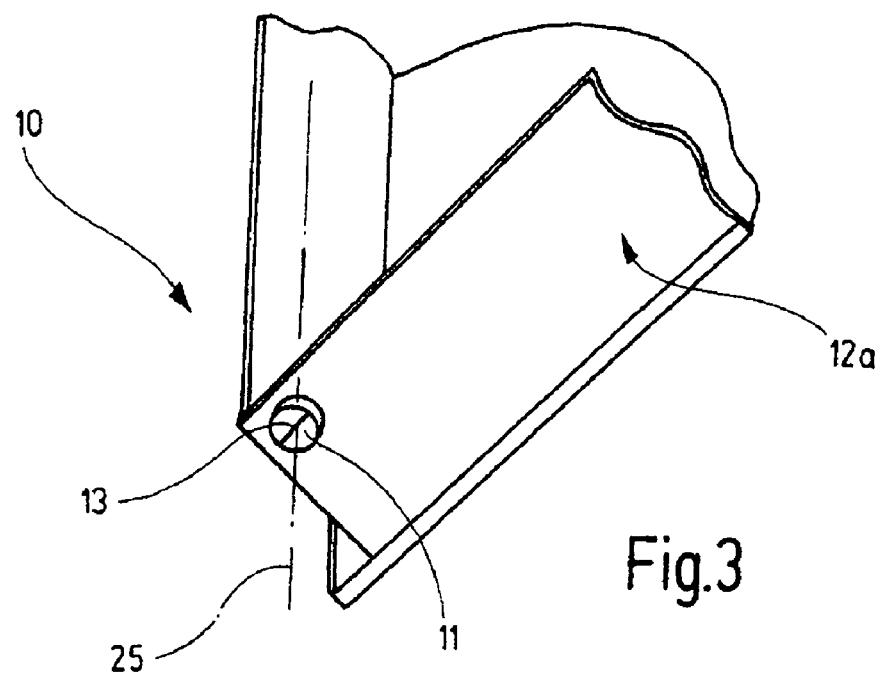
FIG. 3 is a detail view of the ventilation grating in the area of the external face having a joint pin molded inside the external face.

FIG. 3 shows an enlarged illustration of the configuration of the joint pin 11 on the external face 12a of the ventilation grating 10. The joint pin 11 extends in the direction of the pivot axis 25 and is situated approximately in the corner area of the frame-like ventilation grating 10. To make it easier to insert the ventilation grating 10 in the main housing, the pivot pin 11 is provided with a bevel 13, which cuts off at least half of the joint pin 11 in the form of a steep plane to make it easier to thread in the joint pin 11.

Figure 4:
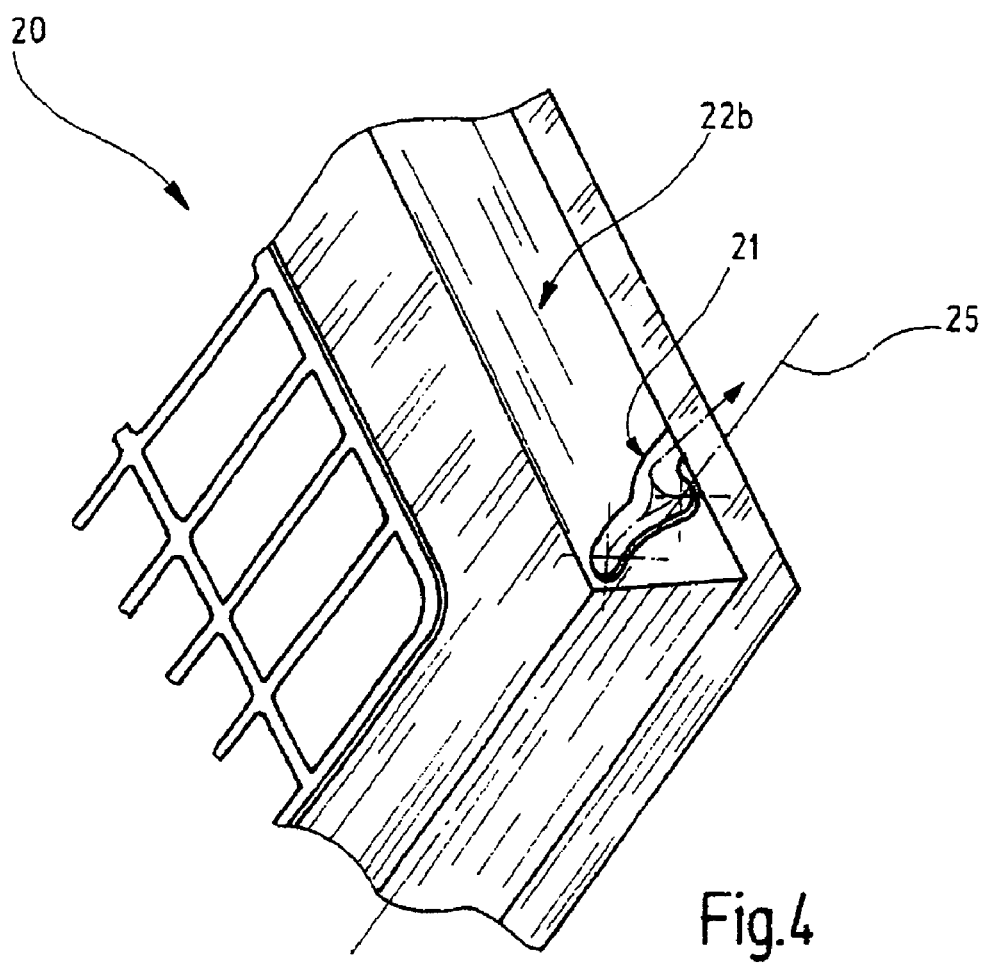
FIG. 4 is a detail view of the main housing in the area of the internal face having a joint pin guide structure implemented inside this face.

FIG. 4 shows the internal side 22b of the main housing 20. A joint pin guide structure 21 is provided therein, which is introduced in the form of a path-like depression in the internal face 22b. The particular assigned joint pin 11 (see FIG. 3) may be threaded into the path-like joint pin guide structure 21 to join the ventilation grating 10 to the main housing 20, so that the joint pin 11 is guided in the joint pin guide structure 21. The guide path of the joint pin 11 inside the joint pin guide structure 21 is indicated by a dashed line.

It is to be noted that because of the perspective illustrations of the ventilation grating 10 in FIG. 3 and of the main housing 20 in FIG. 4, only one side of the articulated connection 30 may be illustrated in each case. Rather, both the external face 12a and also the external face 12b of the ventilation grating 10 each comprise a pivot joint 11, both the internal face 22a and also the internal face 22b of the main housing 20 each also having a joint pin guide structure 21. It is thus obvious that each joint pin guide structure 21 receives one joint pin 11.

Figure 5:
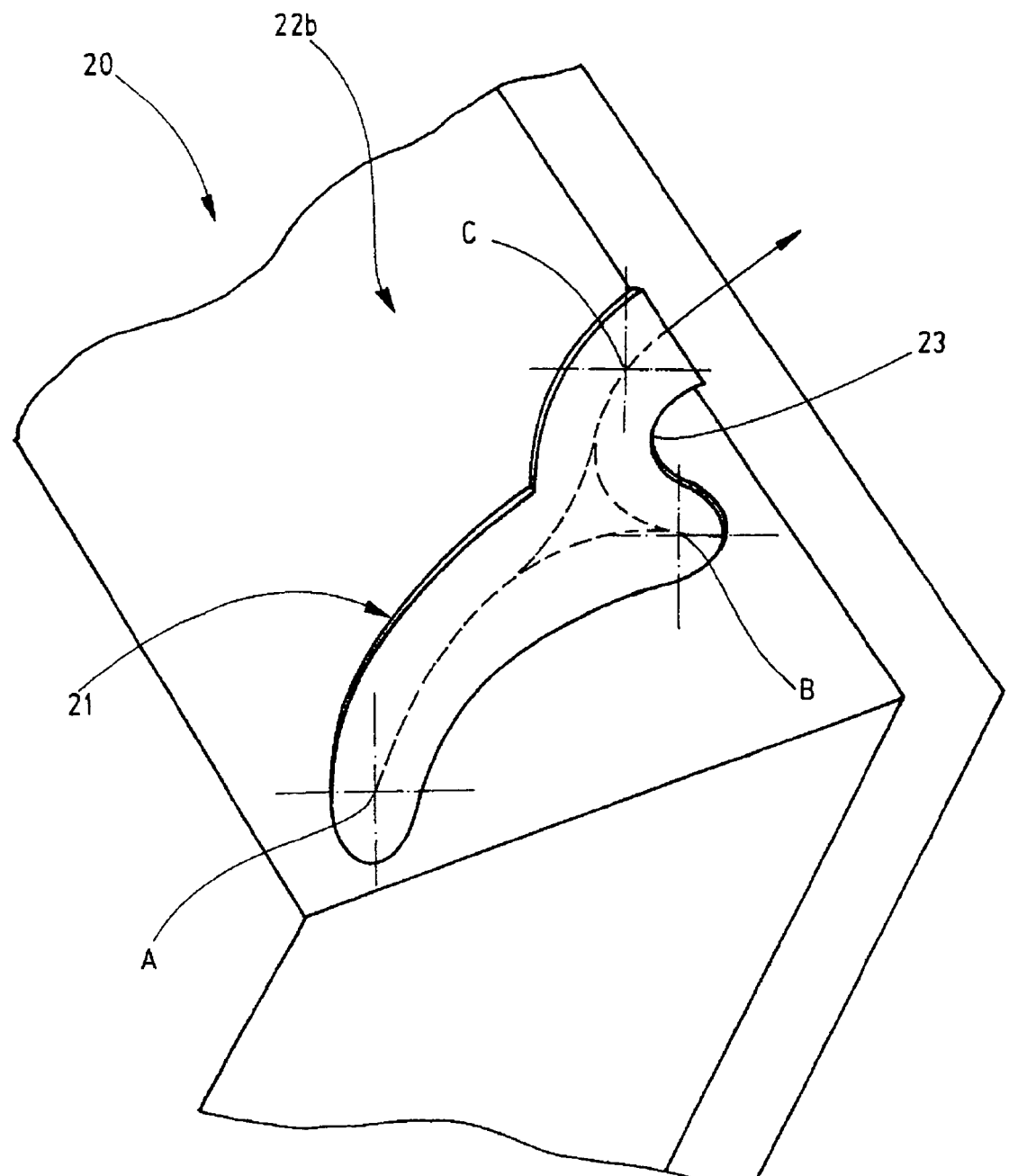
FIG. 5 is an enlarged view of the joint pin guide structure inside the internal face of the main housing from FIG. 4.

FIG. 5 shows an enlarged perspective illustration of the joint pin guide structure 21 inside the main housing 20. It is implemented in the internal face 22b and has a path-like depression inside the internal face 22b. The joint pin guide structure 21 connects at least one closure position A, one folded-out catch position B, and one removal position C to one another. The particular positions are indicated using dot-dash crosses, the removal position C not forming a catch position, but rather only indicating the position from which the joint pins 11 may leave the joint pin guide structure 21. This is indicated by an arrow. The paths on which the joint pins 11 may be displaced between the individual positions A, B, and C are illustrated using a dashed line. If the joint pin 11 is located in the closure position A, the ventilation grating 10 is inserted completely into the main housing 20 and forms the closed state of the air passage device 100. If the ventilation grating 10 is unlocked and pivoted out of the main housing 20, the joint pin first travels from the closure position A into the folded-out catch position B. In the folded-out catch position B, the filter mat may already be removed, corresponding to the illustration in FIG. 2.

If it is necessary to remove the ventilation grating 10 completely from the main housing 20, it may be transferred into the removal position C by a slight, approximately plane-parallel displacement in relation to the main housing 20, so that ventilation grating 10 may be removed completely from the main housing 20 very easily. In order that a transition from the folded-out catch position B into the removal position C may not occur independently, a blocking cam 23 is provided, around which the joint pin 11 must first be guided to reach the removal position C. It is thus ensured that the ventilation grating 10 is situated so it holds itself in the folded-out catch position B, and may not fall out of the main housing 20 unintentionally.

The present invention is not restricted to the preferred exemplary embodiment specified above. Rather, a number of variants are conceivable, which make use of the achievement of the object described even in fundamentally differently designed embodiments. It is also explicitly noted that the joint pins 11 on the ventilation grating 10 are exchangeable with the joint pin guiding structure 21 of the main housing 20, by which the same functionality of the air passage device 100 according to the present invention is achievable.

While specific embodiments of the invention have been shown and described in detail to illustrate the inventive principles, it will be understood that the invention may be embodied otherwise without departing from such principles.

I claim:

1. An air passage device, in particular a filter fan or outlet filter for installation in a mounting opening in a wall or in a housing of a switch cabinet, the air passage device comprising a ventilation grating and a main housing, and a filter mat insertable between the ventilation grating and the main housing, the ventilation grating being situated on the main housing using an articulated connection, wherein, in order to form the articulated connection, the ventilation grating has joint pins, each joint pin being guided in joint pin guide structures in the main housing, wherein the joint pin guide structure is implemented in the internal face inside the main housing, and wherein each joint pin guide structure connects at least one closure position, one fold-out catch position, and one removal position to one another, and wherein the joint pin guide structure comprises a path-like guide between the closure position (A) and the folded-out catch position (B) and the removal position, so that the particular positions are reachable from one another, and wherein the joint pin guide structure comprises a curved path structure so as to provide running of the joint pin in the joint pin guide structure without wedging.

2. The air passage device according to claim 1, wherein the ventilation grating has two diametrically opposite external faces, on each of which an outwardly directed joint pin is molded, wherein the extension directions of the joint pins form a common pivot axis.

3. The air passage device according to claim 2, wherein the main housing has two diametrically opposite internal faces, in each of which a joint pin guide structure is formed, wherein the internal faces of the main housing adjoin the external faces of the ventilation grating.

4. The air passage device according to claim 1, wherein a blocking cam is provided inside the joint pin guide structure between the folded-out catch position and the removal position, to prevent a direct transition from the folded-out catch position into the removal position.

5. The air passage device according to claim 1, wherein the joint pin guide structure is formed in the internal face having a depth of 0.2 mm to 2.5 mm.

6. The air passage device according to claim 5, wherein the joint pin guide structure is formed in the internal face having a depth of 0.5 mm to 1.5 mm.

7. The air passage device according to claim 6, wherein the joint pin guide structure is formed in the internal face having a depth of 1.0 mm.

8. The air passage device according to claim 1, wherein the transition from the folded-out catch position into the removal position is reachable by a plane-parallel displacement of the ventilation grating in relation to the main housing.

9. The air passage device according to claim 1, wherein the joint pins each have a bevel, which point in the direction of the main housing, which may be situated adjoining the ventilation grating, and comprise a partial shortening of the joint pin.

10. The air passage device according to claim 1, wherein the joint pin assumes the closure position in the closed state of the ventilation grating in the main housing, the main housing partially framing the ventilation grating, so that a plane-parallel movement between the ventilation grating and the main housing is prevented.

11. The air passage device according to claim 8, wherein the ventilation grating is held connected to the main housing by the joint pins at least on the side of the pivot axis in the closed.

12. The air passage device according to claim 1, wherein a body edge of the ventilation grating abuts a body edge of the main housing when the joint pin catches in the folded-out catch position, so that the pivot angle in the pivot axis may be delimited.

* * * * *